Patented Dec. 29, 1953

2,664,359

UNITED STATES PATENT OFFICE 2,664,359

GLASS COMPOSITION

David P. Dingledy, Newark, Ohio, assignor to Owens-Corning Fiberglas Corporation, a corporation of Delaware No Drawing. Application June 1, 1951, Serial No. 229,530

13 Claims. (Cl. 106—50)

The present invention relates to a glass composition which because of its properties and particularly its high fluidity is advantageously adapted to the formation of glass articles and especially glass fibers.

A high fluidity without loss of other necessary properties is very desirable in a glass since more production is realized at a standard operating temperature; or the standard production may be obtained at a lower operating temperature with a resulting less severe attack on refractories and the like; or gradations between these extremes may be used.

Especially in the fiber forming art it is a desideratum for a glass to have a high fluidity at its operating temperature in order to produce fibers at an increased rate. Normally, as the operating temperature is increased, a glass becomes more fluid. However, the upper limit of such an operating temperature is set by such factors as other properties of the glass such as volatility, economics, ability to provide that temperature, ability of the apparatus of production continuously to withstand that temperature, and the like. When a glass has a low fluidity at an operating temperature so dictated, it is worked only with difficulty, and when forming fibers, the glass streams solidify almost immediately after leaving the feeder. It is therefore very difficult to attenuate the streams into desired fine fibers. Further, those fibers that are produced tend to be brittle.

However, when a glass has a high fluidity at its operating temperature, it readily flows through the fine orifice openings of a feeder and offers a minimum of resistance to the forces of attenuation in the fiberizing step, such as a blast of steam. In fact, when a glass is quite fluid, the streams issuing from a feeder must practically of necessity be quickly fiberized or otherwise fairly rapidly removed from that vicinity in order to prevent the glass from flooding across the bottom of the feeder. This is true whether the glass is disrupted into discontinuous fibers by a gaseous blast as mentioned, or drawn into long continuous filaments by mechanical pulling means.

It is known that the fluidity of a glass may be increased by incorporating larger quantities of alkalies such as the oxides of sodium or potassium. However, this procedure is objectionable in that the increased alkali content deleteriously affects the properties of the glass, especially its durability, that is, resistance to weathering and the like. This factor is of the utmost importance when glass fibers are to be produced, because they present an enormous surface area per unit weight. For example, when an increased alkali content is present, there is a resulting greater tendency of the fiber surface to absorb water from the atmosphere. The water dissolves the alkali and the solution so formed attacks the silicate in the glass thereby starting a cycle which can culminate in the destruction of the fiber. Accordingly, this method of increasing the fluidity of a glass only creates other problems.

Additionally, the leaching action just described has been found to attack as well the bonding means holding the fibers in a fixed space relation. Ordinarily, for example, in a thermal insulating bat fibers are laid in a helter-skelter, jack-straw arrangement and bound together at their junctures by a binder to impart mass integrity to the accumulated fibers. The binder may comprise a variety of materials, both those naturally occurring and those synthetically produced, but the most commonly employed are thermosetting resins like phenol formaldehyde. In some instances, the fibrous mass is compressed somewhat while the binder is being advanced to a final stage of polymerization in order to provide a denser product.

When the binder is attacked as a result of the leaching action, there is a gradual weakening of the fiber-to-fiber anchorage. Those fibrous products which were compressed during their manufacture actually swell as the binder is destroyed. In uncompressed products, the fibers simply sift apart. In either case, the mass integrity of the product is lost, and it becomes unsuited for the purpose or application for which it was intended.

A leading object of the present invention is to provide a glass composition that possesses a very high fluidity at its operating or working temperature.

Another object is to provide a composition for glass fibers that realizes high fluidity at its operating temperature without a sacrifice in the fibers produced of other desirable properties such as durability, melting rate, acceptable liquidus temperature, and the like.

A further object is to provide a composition for glass fibers which are to be bonded one to another that does not promote attack upon the bond after surface absorption of moisture by the fibers.

More specific objects and advantages are apparent from the following description which merely discloses and illustrates the invention and is not intended to limit the claims.

The invention is a composition of matter comprising the following in substantially the amounts indicated:

| | Weight percent |
|---|---|
| SiO₂ | 40 to 60 |
| Al₂O₃ | 4 to 18 |
| CaO | 15 to 22 |
| MgO | 4 to 12 |
| Na₂O | 10 to 15 |
| B₂O₃ | Up to 6 |
| TiO₂ | 0.5 to 6 |

The total of the silica and alumina should be within the range of 50 per cent to 65 per cent. A minimum of 50 per cent is needed to assure sufficient network forming oxides and to form an acceptable commercially operable glass, that is, one that fuses readily, has a normal viscosity curve, suitable operating temperatures, and the like. If more than 65 per cent is used, the glass becomes too viscous to process satisfactorily. Within these limits, the silica-alumina ratio may vary considerably. However, it is desirable to keep alumina near the minimum of 4 per cent to obtain a low liquidus temperature and glass of good durability.

The total of lime and magnesia should be within the range of 20 per cent to 30 per cent. A minimum of 20 per cent is needed to realize the fluidity desired, while if more than 30 per cent is used, the liquidus temperature becomes too high.

At least 10 per cent of sodium oxide is needed to obtain the needed fluidity, while an amount over 15 per cent causes poor durability in the resulting glass.

Some boron oxide is desirable to buffer the previously described attack on the binder by materials leached from the glass by moisture. It may be that the boron oxide tends to neutralize these materials. A content above six per cent is undesirable from an economic standpoint and also because of the possibility of encountering glass immiscibility at such contents.

Titania is needed in small amounts to impart durability to the glass. More than about six per cent, however, appreciably raises the cost of the batch and the titania is not as effective in imparting durability.

The above system has been unexpectedly discovered to comprise a commercially workable glass having excellent fluidity despite no increase in customary amount of alkali used. Further, articles such as fibers produced from this glass are at least equivalent in durability to other glasses conventionally used for the same purpose.

The desirable range of compositions and the preferred composition of the present invention in weight per cent are:

| | Desirable range | Preferred composition |
|---|---|---|
| | Percent | Percent |
| SiO₂ | 55–60 | 55.4 |
| Al₂O₃ | 4–6 | 4.5 |
| CaO | 15–19 | 18.4 |
| MgO | 4–6 | 6.7 |
| Na₂O | 10–13 | 10.1 |
| B₂O₃ | 2–4 | 3.0 |
| TiO₂ | 1–4 | 1.9 |

Compositions in the desirable range have been found to have a fluidity best suited for production techniques. The preferred composition represents as nearly as it is practicable to determine an optimum balance of the desirable properties contributed by each ingredient.

In one instance, use of the preferred composition provided a five per cent increase in the amount of batch processed to glass fibers as compared to a conventional, popularly employed composition. When it is realized that a glass melting furnace of only average size consumes approximately 500 tons of batch a day, an increase of five per cent allows a very substantial addition to the total amount of products manufactured.

It is believed that the addition of titania without a compensating decrease in boron oxide contributes to the combined fluidity and durability discovered in the present glass. Heretofore, it was customary in glass making when adding titania to use it to replace boron oxide at least in part. It is thought that this decrease in boron oxide assists moisture to leach out the alkalies in the glass fiber surfaces. As described, this leaching action weakens the bond between adjacent fibers and results in a loss of mass integrity in fibrous glass products made from such glasses, if not in destruction of the fibers. It is now felt that the presence of boron oxide is needed to buffer this leaching action. Consequently, in the present invention, especially when an amount of boron oxide in the upper portion of its range is used, fluidity, durability, and resistance to the described leaching action on the fiber bond are jointly provided by the titania and boron oxide.

Since it is difficult to obtain the indicated ingredients of the present invention in a chemically pure state and most impractical so to operate on a commercial basis, impurities are often found in the instant composition. The most common are the oxides of iron and potassium. These and other impurities customarily found in commercial glasses may be tolerated in small amounts. For example, the amount of iron oxide should not exceed about 0.5 per cent in order to obtain a low color level in the glass and good heat penetration. Although potassium oxide may be used to replace sodium oxide in part, as much as an additional two per cent of potassium oxide over the amounts previously disclosed may be used without adverse effect.

While a glass made in accordance with the present invention may be formed, if desired, into the usual pressed, blown, cast, rolled, or extruded objects commonly found in the art, it finds chief application in the manufacture of fibers by such methods as, for example, are disclosed in Patent No. 2,133,236, to Slayter and Thomas and in Patents No. 2,481,543, and No. 2,489,243, to Stalego.

It is also possible to draw glass of the present composition into continuous filaments by means of a spool running at high speeds as disclosed in Patent No. 2,234,986, to Slayter and Thomas.

Glass fibers produced from the instant composition may also be successfully fabricated into position, twisted yarns, ply yarns, and then interwoven, knitted, or braided in various textiles, such as fabrics as disclosed, for example, in Patent No. 2,133,238, to Slayter and Thomas.

However, the principal application of the present invention is in producing fibrous masses for thermal insulation. Ordinarily the fibers are associated in a helter-skelter, jackstraw fashion to form a bat and then bound at their junctures to impart mass integrity to the bat. The bonding action is purely mechanical and, accordingly, the binder may constitute a naturally adhering substance such as asphalt, or a synthetic resin of the thermoplastic type such as polystyrene, or of the thermosetting type such as phenol formaldehyde. The thermosetting type is most often used. One method of application comprises spraying an aqueous solution of the resin in the "A" stage of polymerization onto the fibers, and then advancing the resin to the "C" stage by heat in a manner well known in the art, whereby the mechanical bonding action is obtained.

Various other modifications and changes may be made in the invention within the spirit and scope of the appended claims to meet diverse requirements.

I claim:

1. A composition of matter comprising substantially by weight:

| | Percent |
|---|---|
| $SiO_2$ | 40 to 60 |
| $Al_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 | wherein the sum of the silica and alumina contents is within the range 50 to 65 per cent, and the sum of the lime and magnesia contents is within the range 20 to 30 per cent.

2. Siliceous matter including by weight:

| | Percent |
|---|---|
| $SiO_2$ | 55 to 60 |
| $Al_2O_3$ | 4 to 6 |
| CaO | 15 to 19 |
| MgO | 4 to 6 |
| $Na_2O$ | 10 to 13 |
| $B_2O_3$ | 2 to 4 |
| $TiO_2$ | 1 to 4 | wherein the sum of the silica and alumina contents does not exceed 65 per cent.

3. A glass having high fluidity at its operating temperature comprising substantially by weight:

| | Percent |
|---|---|
| $SiO_2$ | 55.4 |
| $Al_2O_3$ | 4.5 |
| CaO | 18.4 |
| MgO | 6.7 |
| $Na_2O$ | 10.1 |
| $B_2O_3$ | 3.0 |
| $TiO_2$ | 1.9 |

4. A glass fiber comprising substantially by weight:

| | Percent |
|---|---|
| $SiO_2$ | 40 to 60 |
| $Al_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 | wherein the sum of the silica and alumina contents is within the range 50 to 65 per cent, and the sum of the lime and magnesia contents is within the range 20 to 30 per cent.

5. A glass having fluidity adaptable to the rapid formation of fibers consisting by weight of:

| | Percent |
|---|---|
| $SiO_2$ | 55 to 60 |
| $Al_2O_3$ | 4 to 6 |
| CaO | 15 to 19 |
| MgO | 4 to 6 |
| $Na_2O$ | 10 to 13 |
| $B_2O_3$ | 2 to 4 |
| $TiO_2$ | 1 to 4 | wherein the sum of the silica and alumina contents does not exceed 65 per cent.

6. As an article of manufacture, a glass product comprising substantially by weight:

| | Percent |
|---|---|
| $SiO_2$ | 40 to 60 |
| $Al_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 | wherein the sum of the silica and alumina contents is within the range 50 to 65 per cent, and the sum of the lime and magnesia contents is within the range 20 to 30 per cent.

7. A composition of matter comprising substantially by weight:

| | Percent |
|---|---|
| $SiO_2$ | 40 to 60 |
| $Al_2O_3$ and $Fe_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 | wherein the iron oxide content does not exceed 0.5 per cent; the sum of the alumina, silica, and iron oxide contents is within the range 50 to 65 per cent; and the sum of the lime and magnesia contents is within the range 20 to 30 per cent.

8. A composition of matter comprising substantially by weight:

| | Percent |
|---|---|
| $SiO_2$ | 40 to 60 |
| $Al_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 |
| $K_2O$ | Up to 2 | wherein the sum of the alumina and silica contents is within the range 50 to 65 per cent, and the sum of the lime and magnesia contents is within the range 20 to 30 per cent.

9. A composition of matter comprising substantially by weight:

| | Percent |
|---|---|
| $SiO_2$ | 40 to 60 |
| $Al_2O_3$ and $Fe_2O_3$ | 4 to 18 |
| CaO | 15 to 22 |
| MgO | 4 to 12 |
| $Na_2O$ | 10 to 15 |
| $B_2O_3$ | Up to 6 |
| $TiO_2$ | 0.5 to 6 |
| $K_2O$ | Up to 2 | wherein the iron oxide content does not exceed 0.5 per cent; the sum of the alumina, silica, and iron oxide contents is within the range 50 to 65 per cent; and the sum of the lime and magnesia contents is within the range 20 to 30 per cent.

10. A glass having high fluidity at its operating temperature comprising from 40 to 60 per cent by weight silica, from 4 to 18 per cent by weight alumina, from 15 to 22 per cent by weight lime, from 4 to 12 per cent by weight magnesia, from 10 to 15 per cent by weight sodium oxide, from 0.5 to 6 per cent by weight titania and up to 6 per cent by weight boron oxide.

11. A glass composition having the following composition by weight:

| | Percent |
|---|---|
| $SiO_2$ | 40 to 60 |
| $Al_2O_3$ | 4 to 18 |
| CaO | 15 to 22 |
| MgO | 4 to 12 |
| $Na_2O$ | 10 to 15 | and including both titania and boron oxide, said titania and boron oxide each being present in an amount less than 6 per cent of the total weight.

12. Siliceous matter comprising by weight:

| | Percent |
|---|---|
| $SiO_2$ | 55 to 60 |
| $Al_2O_3$ | 4 to 6 |
| CaO | 15 to 19 |
| MgO | 4 to 6 |
| $Na_2O$ | 10 to 13 | and including both titania and boron oxide, said titania and boron oxide each being present in an amount less than 6 per cent of the total weight.

13. A glass having high fluidity at its operating temperature consisting essentially of from 55 to 60 per cent by weight silica, from 4 to 6 per cent by weight alumina, from 15 to 19 per cent by weight lime, from 4 to 6 per cent by weight magnesia, from 10 to 13 per cent by weight sodium oxide, from 0.5 to 6 per cent by weight titania, up to 6 per cent by weight boron oxide, and minor proportions of incidental impurities.

DAVID P. DINGLEDY.

References Cited in the file of this patent

UNITED STATES PATENTS

| Number | Name | Date |
|---|---|---|
| Re. 23,049 | Armistead | Nov. 23, 1948 |
| 2,055,446 | Powell | Sept. 22, 1936 |
| 2,468,654 | Brundell et al. | Apr. 26, 1949 |
| 2,523,264 | Armistead | Sept. 26, 1950 |
| 2,523,265 | Armistead | Sept. 26, 1950 |
| 2,527,693 | Armistead | Oct. 31, 1950 |